(12) United States Patent
Campisano et al.

(10) Patent No.: US 7,729,421 B2
(45) Date of Patent: Jun. 1, 2010

(54) LOW LATENCY VIDEO DECODER WITH HIGH-QUALITY, VARIABLE SCALING AND MINIMAL FRAME BUFFER MEMORY

(75) Inventors: Francesco Campisano, Owego, NY (US); Dennis Cheney, Vestal, NY (US); David A. Hrusecky, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 2168 days.

(21) Appl. No.: 10/079,651

(22) Filed: Feb. 20, 2002

(65) Prior Publication Data
US 2003/0156650 A1    Aug. 21, 2003

(51) Int. Cl.
*H04N 7/12* (2006.01)
*H04N 11/02* (2006.01)

(52) U.S. Cl. .............................. 375/240.01; 375/240.25

(58) Field of Classification Search ................................
375/240.01–240.03, 240.12–240.16, 240.18,
375/240.19, 240.2, 240.25, 240.28
See application file for complete search history.

(56) References Cited

U.S. PATENT DOCUMENTS

| | | | |
|---|---|---|---|
| 5,301,242 A | | 4/1994 | Gonzales et al. |
| 5,576,765 A | | 11/1996 | Cheney et al. |
| 5,583,652 A | * | 12/1996 | Ware .............................. 386/75 |
| 5,596,420 A | | 1/1997 | Daum |
| 5,668,599 A | * | 9/1997 | Cheney et al. .......... 375/240.15 |
| 5,771,075 A | | 6/1998 | Rim et al. |
| 5,959,684 A | | 9/1999 | Tan et al. |
| 6,072,548 A | * | 6/2000 | Schoner et al. ......... 375/240.26 |
| 6,091,769 A | | 7/2000 | Moon |
| 6,128,340 A | | 10/2000 | Ozcelik et al. |
| 6,442,206 B1 | * | 8/2002 | Hrusecky ............... 375/240.21 |
| 6,459,811 B1 | * | 10/2002 | Hurst, Jr. ..................... 382/232 |
| 6,621,867 B1 | * | 9/2003 | Sazzad et al. .......... 375/240.26 |
| 6,707,926 B1 | * | 3/2004 | Macy et al. ................. 382/100 |
| 7,006,588 B2 | * | 2/2006 | Simmons et al. ............ 375/368 |

FOREIGN PATENT DOCUMENTS

EP    0612186 A2    8/1994

(Continued)

OTHER PUBLICATIONS

J. Fukuda and M. Oie; Variable Scale Vertical Expansion for Flat Panels;Jan. 1995; pp. 157-166; *IBM Technical Disclosure Bulletin*, vol. 38, No. 01.

(Continued)

*Primary Examiner*—David Czekaj
(74) *Attorney, Agent, or Firm*—Whitham, Curtis, Christofferson & Cook, P.C.; Anthony J. Canale

(57) ABSTRACT

Loss of decoding time prior to the vertical synchronization signal when motion video is arbitrarily scaled and positioned by placing the frame switch point at the completion of frame decoding and synchronizing the bottom border of the scaled image therewith while maintaining low latency of decoded data. High latency operation is provided only when necessitated by minimal spill buffer capacity and in combination with fractional image size reduction in the decoding path in order to maintain image resolution without requiring additional memory.

9 Claims, 4 Drawing Sheets

FOREIGN PATENT DOCUMENTS

| | | |
|---|---|---|
| EP | 0 896 479 A2 | 2/1999 |
| EP | 0612186 A2 | 8/2001 |
| GB | 2338383 A | 12/1999 |
| WO | WO 95/12288 | 10/1994 |

OTHER PUBLICATIONS

R. M. Fleishman, T. J. Micallef and B. J. Wilkie; Programmable Receiver for a Multi-Media System; Nov. 1993; pp. 125-126; *IBM Technical Disclosure Bulletin*, vol. 36, No. 11.

* cited by examiner

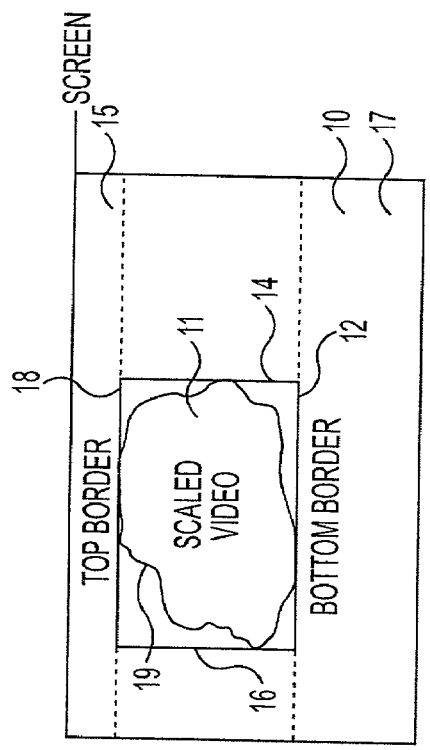
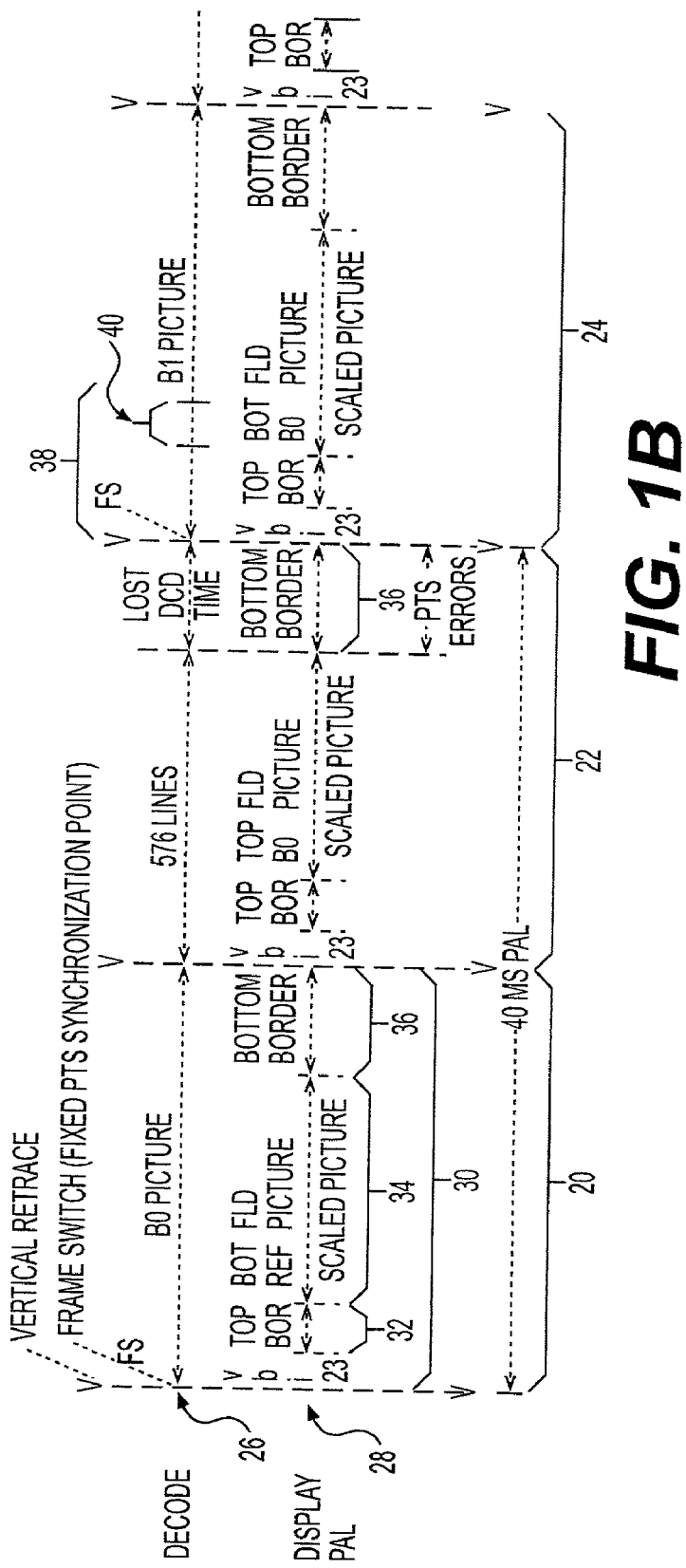
FIG. 1A (RELATED ART)
FIG. 1B

LOW LATENCY VIDEO DECODER WITH HIGH-QUALITY, VARIABLE SCALING AND MINIMAL FRAME BUFFER MEMORY

BACKGROUND OF THE INVENTION

1. Field of the Invention

The present invention generally relates to decoding of digital video image information and, more particularly, to decoding of digital motion video signals with high quality and arbitrary scaling and positioning while achieving low latency and minimal memory capacity requirements.

2. Description of the Prior Art

Transmission of data in digital form is generally favored over transmission in analog form at the present time in view of the inherent degree of noise immunity and potential for facilitating error correction and data compression. These qualities are particularly desirable in regard to image data where small artifacts caused by noise or transmission errors are particularly evident to the eye. However, the volume of data that may be necessary to express a full range of color and intensity in an image at high resolution is particularly large and data compression is particularly important for acceptable performance of systems for communicating, manipulating and presenting still or moving images.

In fact, the amount of data in an image is so large that a high degree of compression is required for practical management of transmission and storage during decoding of digitized data, particularly for moving images or video programs. Accordingly, a number of data compression standards have been developed to deliver a sufficient degree of compression and allow image decoding within required response times. For example, a standard referred to as JPEG (Joint Photographic Experts Group) has been developed and widely adopted for compression of still images. This standard allows substantial flexibility in coding in order to allow an arbitrarily high degree of data compression with minimized degradation of image quality. Similarly a standard known as MPEG (Moving Pictures Experts Group) has been developed for coding sequences of images to be reproduced by a display device in sufficiently rapid succession to achieve the illusion of motion, referred to as motion video. The MPEG standard particularly exploits redundancy between frames or fields to achieve a higher degree of compression and higher decoding speed.

Due to differences in the implementation of these standards and the way image data is utilized between still and video images, decoding in accordance with the JPEG standard is usually implemented in software with a data processor and display such as a personal computer (PC) while decoding in accordance with the MPEG standard is generally implemented in hardware such as a so-called set-top box (STB) in connection with a television set or a computer monitor. A set-top box comprises an audio decoder and a video decoder for signals which are fed to them from a multiplexed transport signal carrying numerous (e.g. often several hundred or more) audio and video channels.

An audio and video channel pair is coupled together by control parameters in their respective data streams that permits re-synchronization of the two streams with respect to each other but with a substantially fixed transmission delay. In the video stream, at a basic level, the signal for re-synchronization of audio and video is referred to as the presentation time stamp (PTS).

By far the simplest and most widely implemented method to achieve a PTS synchronization point is to choose a fixed point in time relative to the video decode and display of a motion video image and to make a synchronization decision based upon whether the fixed point falls before or after an internal clock signal. The chosen fixed point typically is located between one video field and the next sequential video field and generally defines a frame of two fields which make up a single image of the motion video image sequence. Another typical point is the change between the decode of one compressed video picture and the decode of the next sequential compressed video picture. In most cases, these criteria result in the same point, depending on the decode latency for each picture.

At this PTS synchronization point, a decision is made to either continue with normal decode processing or to take corrective action such as omitting or skipping over an image if decoding is slow or repeating the output of an image if decoding is running too fast. To make this decision, the difference between the PTS and the internal clock signal is tested at the same point relative to the displayed picture and a confident decision can be made at every image to take corrective action as soon as excessive differences are detected.

The above synchronization technique has worked well for full-screen images decoded by early video decoders. However, some functions such as arbitrarily scaled images and picture-in-picture displays at arbitrary screen locations, which were developed and provided in television sets receiving analog transmissions which do not require significant decoding, are now being demanded in STBs. Arbitrary change of dimensions (e.g. image aspect ratio) has also been demanded (particularly for so-called letterbox format presentation of uncropped movie film frames which are desirably presented in a band across the center of a television screen and well above the bottom of the image area). That is, it is now required that the STB display a scaled image or picture-in-picture of any desired size, shape and location on the display screen in addition to the data processing intensive decoding of images from compressed data.

As is understood by those skilled in the art, frame structured compressed image data is decoded in an order which is different from the order in which the image elements are presented in a scanned display pattern such as an interlaced raster. Therefore, decoded data must be stored in the STB for a period which varies within a field or frame until the proper location is reached in the scan pattern. The maximum storage period or latency of data from decoder to display is referred to as decode latency or decoder latency and is important in determining the capacity and configuration of memory required to perform the required storage and read out of data in synchronism with the display while decoding time may vary widely.

The functionality requirement of arbitrarily scaled and positioned image presentation has important implications in regard to decoder and display synchronization and image quality. As can be appreciated by those skilled in the art, if the bottom of any arbitrarily scaled and located image is significantly above the bottom of the display frame, a correspondingly significant amount of decoding time is lost since the entire image must be decoded and processing for scaling and positioning performed well before the end of the display frame or field (where the PTS synchronization point is typically located) is reached. Further, as the picture position rises on the screen, the time gap between the end of the picture display and the PTS synchronization point, also referred to as the frame switch point, increases as does the error in the calculation for monitoring PTS synchronization.

For example, in a PAL, NTSC or other standard system using 1.5 frames of latency between decode and display of reference images, often referred to as "I" (independent) or "P" (predicted) images, (which are fully decoded rather than wholly or partially interpolated or predicted from prior and/or subsequent images), there is only 0.5 images of latency between decode and display of bidirectionally interpolated ("B") images, for which a future image must be decoded to enable interpolation, while the PTS synchronization point, where a decision is made whether or not to decode the next field or frame, is located at the vertical retrace interval of the display. Therefore, it can be easily understood that if the bottom of the scaled and/or positioned image is above the bottom of the raster display area, the decoding of a B image must be completed significantly before the vertical retrace interval and frame switch PTS point to avoid corruption of the top (e.g. first displayed) field of the B picture.

That is, in the case of a frame structured encoded picture where both the top and bottom fields (sometimes referred to as odd and even fields) are decoded simultaneously, the image B0 (an interpolated image using both preceding and following images) is required to be fully decoded significantly before the next frame switch point to maintain a 0.5 image latency; without which the top field of the B0 picture being displayed in an interlaced fashion would be corrupted. In other words, the decoded image must be buffered for 0.5 frames (one field) in order to read out data in the proper order for display because both fields of a frame are decoded concurrently and the decoding must be complete by the time the lower edge of the top frame of the scaled image is reached for interlaced display. The lost decode time in this case is inherent for a decode latency of 0.5 and increases as the picture placement rises on the screen.

Longer decode latency is a possible solution although it may complicate synchronization and, more importantly, carries substantial hardware costs that are commercially unacceptable to provide the amount of memory required to store the decoded image (and audio) data for the increased period. For example, to increase latency from 1.5 fields to 2.0 fields in the above scenario would increase the amount of high speed access memory required by at least an amount to contain a display field and, at a minimum, similarly increase the amount of circuitry necessary to control and appropriately access the memory, particularly during corrective action for synchronization even in the rudimentary forms described above.

Further, in order to maintain the image decode latency of only 0.5 for partially interpolated pictures, the size of the frame buffer must be increased as the size of the displayed result is decreased and the upper boundary of the scaled image is made to appear lower on the display. The specific component of the frame buffer that must be increased in capacity is referred to as a spill buffer and is disclosed in U.S. Pat. No. 5,576,765 which is hereby fully incorporated by reference.

In essence, a spill buffer is required even for full frame images since new decoded data can not be stored until the previous frame/field data has been read out; thus requiring an increase of frame buffer capacity for an interval equal to the vertical blanking interval, any top border of the field and a number of scan lines corresponding to a macroblock band (usually sixteen lines) into which the image is divided for compression. For arbitrary scaling and positioning where the top border could approach the frame height, a spill buffer capacity in excess of a full field would be required; substantially the same amount of extra storage as would be required for 2.0 frame latency. If a spill buffer is not provided, this period, subsequent to the PTS timing, would also be lost for decoding purposes since no memory locations would be available to receive decoded data in the frame buffer. Again, provision of such amounts of memory as is required by spill buffers in STBs is prohibitive and will be so well into the future.

Additionally, as images are scaled to smaller sizes the image quality tends to degrade since the frame buffers are constructed with a finite number of taps to subsample the image data. The number of taps is not increased and cannot be effectively increased as the picture is scaled. Therefore, the resolution of the picture becomes relatively lower as size is reduced. Increasing the number of taps causes a significant increase in memory access bandwidth required to feed original picture data to additional taps. Variation of the number of effective taps with picture size that is desirably continuously variable is also prohibitively complicated for inclusion in STBs.

Due to the memory requirements alluded to above and the difficulty of increasing speed of decoding, at some point, achieving display of small and high-positioned images requires an adjustment between decode and display latency. One approach is disclosed in "MPEG Video Decoder with Integrated Scaling and Display Functions", now U.S. Pat. No. 6,470,051, which is hereby fully incorporated by reference. In that approach, a fixed amount of scaling was performed in the decoding path and the scaled image simply placed on the screen. Performing scaling in the decoding path reduces the amount of required data storage capacity in the frame buffer to the point that a spill buffer may not be used and its size thus limited as may be dictated by economic constraints. However, this function has substantially less than the full desired flexibility of continuous and arbitrarily variable image scaling.

In summary, decoding of B images is the most difficult among the types of image a STB may be required to decode because they are the most compressed and require a greater number of references to previous and future decoded images in the decoding process. Decoding of B images also presents the most demanding requirements for scheduling buffering and output of the decoded image data. Therefore the loss of decoding time due to scaling and positioning is most critical for B images which make up a substantial fraction of the images in a compressed motion picture sequence and effectively prevents flexible scaling and positioning in a commercially feasible STB at the present state of the art.

SUMMARY OF THE INVENTION

It is therefore an object of the present invention to provide a technique for recovery of lost decode time while preserving low decode latency relative to the display.

It is another object of the invention to provide a reduction in the synchronization error due to increasing time gap between the end of a displayed image and the display frame switch point as the position of a scaled image on a display screen rises.

It is a further object of the invention to minimize required frame memory and spill buffer capacity while maintaining picture quality as the scale size is reduced.

It is yet another object of the invention to provide a technique of choosing between low latency and high latency decode schemes to facilitate maintaining image quality while providing full flexibility of image scaling and positioning.

In order to accomplish these and other objects of the invention, a method of operating a motion video decoder for decoding compressed image data is provided including steps of determining a frame switch point in accordance with a signal corresponding to completion of decoding of a previous frame, and synchronizing the motion video decoder with a bottom border of a scaled image.

In accordance with another aspect of the invention, a method of operating a motion video decoder comprising steps of testing spill buffer capacity responsive to said signal to produce a test result and controlling scaling in a decoding path of a decoder and altering decoder latency in response to the test result.

BRIEF DESCRIPTION OF THE DRAWINGS

The foregoing and other objects, aspects and advantages will be better understood from the following detailed description of a preferred embodiment of the invention with reference to the drawings, in which:

FIG. 1A shows the outline of an arbitrary scaled image superimposed on the display area of a display screen, FIG. 1B is a timing diagram illustrating the problem addressed by the invention.

DETAILED DESCRIPTION OF A PREFERRED EMBODIMENT OF THE INVENTION

Figure 2:
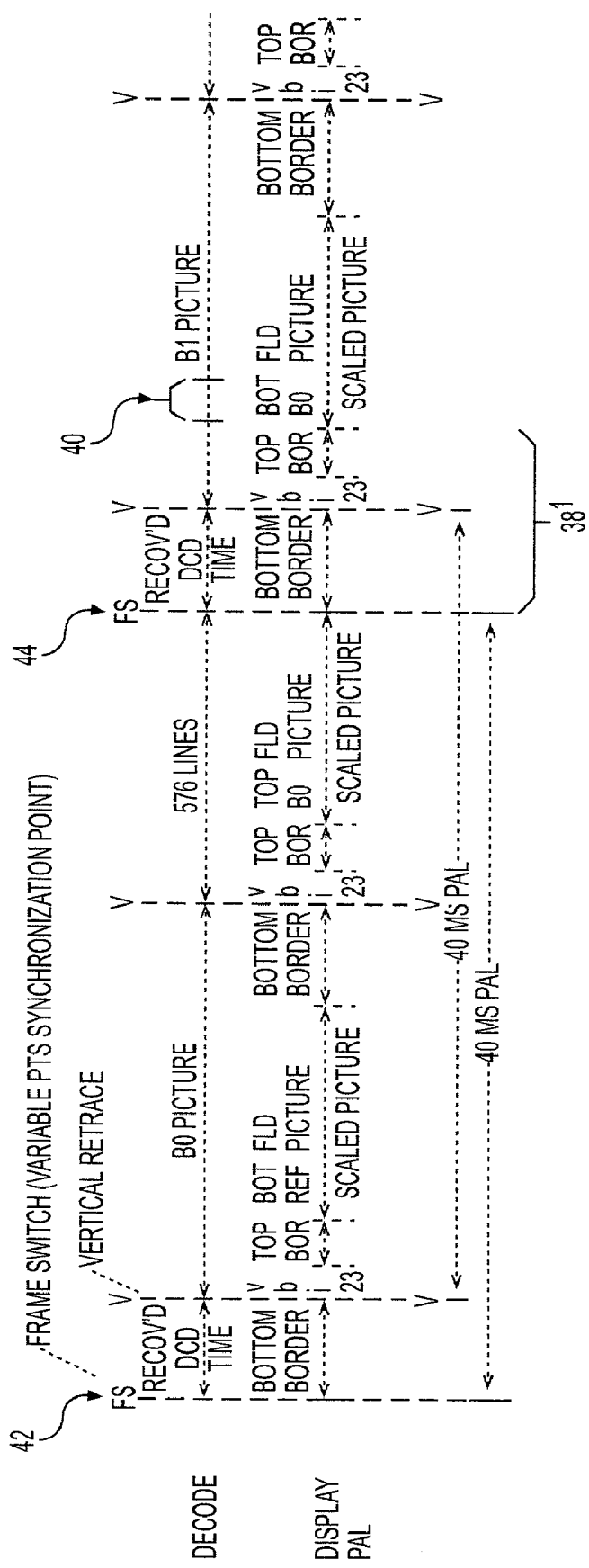
FIG. 2 is a timing diagram illustrating the basic principles of the invention.

Referring now to the drawings, and more particularly to FIGS. 1A and 1B, there is shown a depiction of a motion video image arbitrarily scaled and positioned on a display area of a display screen and a timing diagram corresponding to the above-described scenario that will be useful in understanding the problem addressed by the invention, respectively. Referring to FIG. 1A, particularly for definition of terminology used herein, a rectangular display area 10 is provided which corresponds to the raster size of the display but may or may not correspond to the dimensions of the hardware display screen. However, it will often be the case that the screen area and the display area 10 will be congruent and, for simplicity, the terms screen and display area may be used interchangeably. Within this display area 10 a rectangular scaled motion video area 11 having boundaries 12, 14, 16 and 18, defines a top border area 15 and a bottom border area 17.

It should be understood that these boundaries may be placed as desired and the scaled video area 11 may be of any aspect ratio (e.g. width to height). It should also be understood that the juxtaposition of image and display areas illustrated in FIG. 1 is generally known and produced by other arrangements, as alluded to above, and which it is the purpose of the invention to perform in the context of a commercially feasible STB capable of producing high motion video image quality with negligible, if any, decoding artifacts and low decoder latency. Therefore, no portion of FIG. 1A is admitted to be prior art in regard to the present invention and FIG. 1A is labelled "related art".

Since it is assumed for purposes of this discussion of the invention and in conformance with well-established (but not necessarily universal) display conventions that the scanning pattern comprises horizontal lines in a vertical sequence, the right and left boundaries 14 and 16 are of no consequence to the invention and can be defined as desired. By the same token, the shapes of the lower and upper boundaries may be changed at will to produce other scaled video area shapes (e.g. 19) by any of a variety of techniques which will be apparent and familiar to those skilled in the art. Those skilled in the art will be able to envision the corresponding problems and practice the invention in regard to any other scan sequence pattern based on the following discussion.

However, it should be understood that the maximum extent of the scaled motion video image where it abuts the top and bottom border areas 15, 17 corresponds to the digital image data and that the location of the top and bottom extremes of the image cause the loss in decoding time alluded to above. More specifically, the invention seeks to recover the lost decoding time caused by the bottom border 12 in a manner consistent with the accommodation of the spill buffer to recover the decoding time lost in the top border while minimizing capacity requirements for the spill buffer and not requiring increase of decoding speed.

FIG. 1B shows a timing diagram illustrating the loss of decoding time of a known system utilizing a fixed PTS synchronization point were to be used in obtaining scaling. Accordingly, while FIG. 1B does not illustrate the invention and is arranged to facilitate an understanding of the problem addressed by the invention, no portion of FIG. 1B is admitted to be prior art in regard to the invention.

FIG. 1B is divided into intervals 20, 22 and 24, separated by vertical synchronization signals, V, that define fields and comprises two time lines: one (26) for decoding and one (28) for display. For convenience and clarity, the fixed PTS synchronization point, sometimes referred to as a frame switch point, FS, is coincident with alternate vertical synchronization signals, as is usually the case, and define frames. It can be seen that there is a one field or 0.5 frame latency between the time of beginning the decoding of a frame, in this case B0 at the beginning of interval 20 (during which the bottom field of a reference image, the decoding of which began 1.5 frames earlier, assuming 1.5 frames latency for reference images, is being displayed), and the beginning of the field/interval 22 in which the top field of the image is to be displayed. As indicated above, compressed data, if frame structured, the two interlaced fields (referred to as top/bottom or odd/even) are decoded concurrently.

Referring to time line 28, each field begins with a vertical blanking interval, vbi, and the remainder of the field time 30 corresponds to the raster scanning period of the display. When the image is to be scaled, interval 30 must include the time 32 for scanning the top border, the time 34 for scanning the scaled image 11 and the time 36 for scanning the bottom border 17. Decoding is generally performed in accordance with a macroblock wide slice of the image usually comprising sixteen scan lines. Display of a slice may be started as soon as the slice of a particular image is decoded. However, an interlaced scan (which displays only half the lines of a slice in each of two interlaced fields) may proceed through a slice at a higher rate than decoding of a slice can be performed. Therefore, a degree of latency is provided so that the decoding of both fields can be completed by the time the last slice of the top field is reached for display. That is, at the present state of the art, it is not possible to guarantee the decoding can proceed as rapidly as display scanning may require.

This is illustrated in line 26 of FIG. 1B where the decoding of the B0 image begins at the start of interval 20 and extends through most of interval 22 while in line 28, the display of the top field of the B0 image begins shortly after the start of interval 22 and the completion of the decoding of the B0 image and the completion of the display of the top field of the B0 image are coincident at the beginning of the display of the bottom border. If an image is to be presented at full screen size, the bottom border would, of course, be zero and substantially the entirety (e.g. less the last macroblock wide slice) would be available for decoding. It can thus be seen that higher image placement on the screen and increase of the size of bottom border 12 increases the interval 36 and reduces time available for decoding. At the same time, as interval 36 increases, the error in computing the PTS difference increases, as well.

It should also be appreciated that, as alluded to above, motion video data for one image of a sequence must be read out from memory and displayed to make room for more decoded motion video data for a frame to be displayed later. Display, of course cannot begin until the vertical blanking period, vbi, elapses, even for a full screen image display. Therefore, unless a spill buffer is provided, decoding cannot begin until the vbi and a period 40 corresponding to the read out of the first macroblock slice have both elapsed.

If, however, the image is scaled and positioned such that a top border 18 is presented, the start of decoding would be delayed for a corresponding period 38 (corresponding to the vbi, scanning the width of the top border and the read out for display of a macroblock slice of image data) unless the capacity of the spill buffer is correspondingly increased to accommodate the data which could be decoded during that period. It should be recognized, in this regard, that the cost of frame buffer capacity and the cost of spill buffer capacity are approximately the same except that frame buffer capacity must be increased in increments corresponding to full fields while some excess beyond minimum spill buffer capacity can be provided at little, if any, cost due to the optimally economical configurations of memory chips.

Therefore, increase of latency, by itself, which would increase the required capacity of the frame buffer does not provide any economic advantage over increase of spill buffer capacity and both alternatives are substantially prohibitive economically while a spill buffer of a minimum but significant capacity is required in addition to the frame buffer to avoid loss of decoding time immediately following vertical retrace, V, during full screen displays. Scaling during decoding in combination with increased latency can be performed without increase of memory since less data is produced but achieves only scaling by powers of two (e.g. requiring expansion after reduction that compromises resolution for many popular formats such as three-quarter size and letterbox format).

In summary, as a practical matter, reduction of decoding time sufficient to provide flexible scaling and positioning even to vertically centered letterbox format cannot be guaranteed, particularly for B images which are most difficult to decode and carry the most severe scheduling constraints of only 0.5 frames latency. Further, increase of spill buffer capacity can recover only the portion of otherwise lost decoding time that occurs after the vertical synchronization point and increase of latency forces a trade-off between resolution and frame buffer capacity.

Referring now to FIG. 2, the invention solves these problems and recovers otherwise lost decoding time by providing a variable frame switch point preferably and optimally placed substantially coincident with the start of display of the bottom border and at or after completion of decoding of the previous image, well in advance of the vertical synchronization point. It should be recognized from a comparison of FIG. 2 with FIG. 1B that the decoding and display functions are the same except that the decision concerning whether or not to decode a frame when the synchronization error becomes too large is made at an earlier point so that decoding can be initiated as soon as display of the prior image has been completed and preferably coincident with the start of scanning of the bottom border.

Display synchronization preferably remains referenced to the vertical synchronization point, V, since the image position and, hence, the position of bottom border 12 are controlled at the will of the operator. Further, since the start of the bottom border and the frame switch point are preferably coincident, maximum possible decoding time equal to a full frame display time is provided from 42 to 44 (40 milliseconds for PAL, 33 milliseconds for NTSC). Thus the size of the display and its position are irrelevant to the amount of decode time an image is allowed to consume. Further, the PTS error is removed since there is little, if any, time gap between the end of the display and the frame switch point.

Since the magnitude of synchronization error which is allowed to trigger skipping of an image can be a significant fraction of a frame, there is substantial flexibility in choice of a signal to be followed in setting of the frame switch point FS, each of which may provide particular advantages or support particular features. For example, if the MPEG end-of-frame signal is used and tracked by FS, the decoder essentially becomes free-running and earlier completion of decoding of one frame can expand the time available for decoding the next. However, in such an implementation it may be desirable to limit the advance of FS relative to V over a plurality of frames because of spill buffer capacity considerations.

Specifically, when FS is advanced relative to V in accordance with the invention, the start of period 38' covered by the spill buffer also must be advanced to receive decoded data and must continue until some previously decoded and stored data can be read out to the display. This period thus must cover both the top and bottom border scanning periods, the vertical blanking interval, vbi, and the time 40 for scanning of an image slice. Therefore, the spill buffer must be of greater than minimum size but the capacity is not critical to the practice of the invention in accordance with its basic principles and can be based entirely on economic considerations. As alluded to above possibly substantial excess spill buffer capacity may be provided at essentially no cost due to standard capacities of commercially available memory chips. Further, as discussed below, it would seldom be necessary or even desirable to have the spill buffer capacity exceed one-half of a display field (except, possibly, for extreme vertical scaling, centrally positioned, where top and bottom borders are both maximized and with little, if any horizontal scaling, in which case a spill buffer of approaching or equal to one field capacity would be necessary to maintain full resolution).

Figure 3:
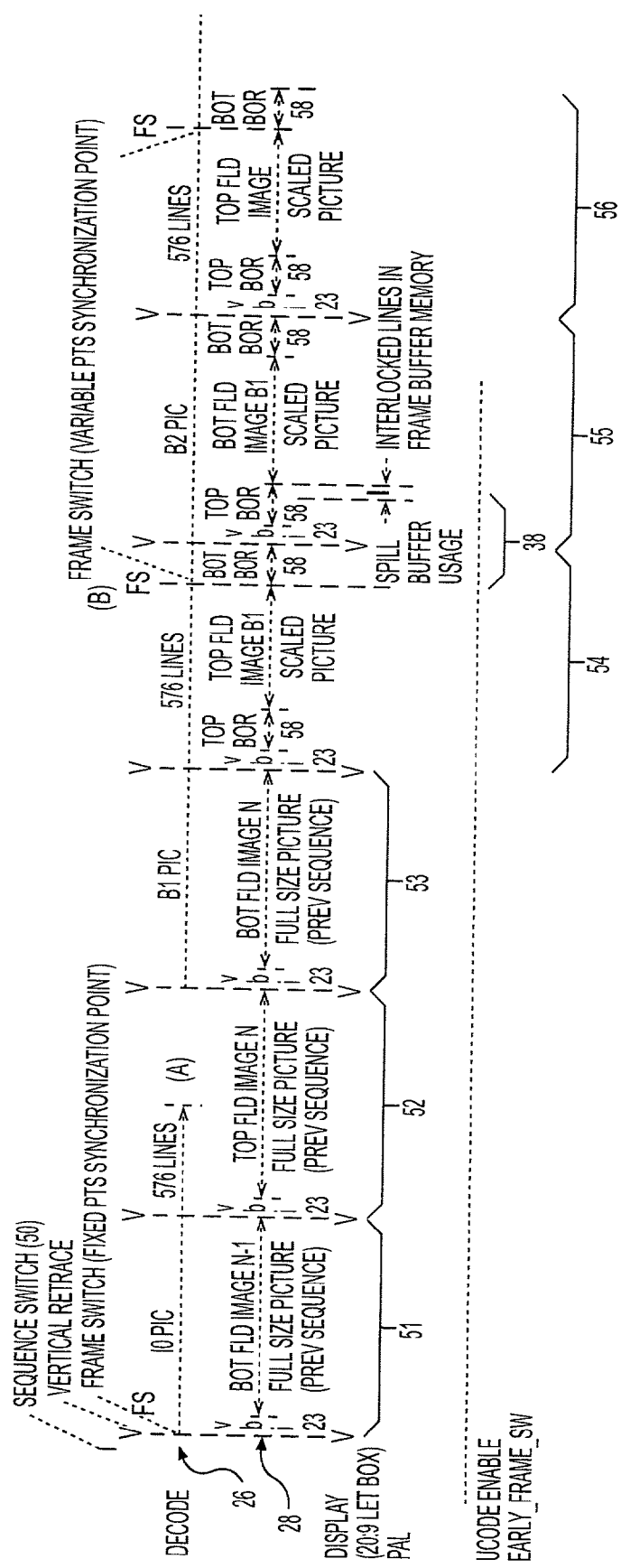
FIG. 3 is a timing diagram illustrating the operation of the invention where the display is changed from full screen size to a scaled presentation such as letterbox format.

Referring now to FIG. 3, an exemplary operation of the invention to switch from full screen image display to a scaled and positioned (e.g. letterbox format) image display of a PAL I, B, B video stream will now be discussed. As can be appreciated, there is no need for variable PTS synchronization when the image is not scaled and is presented at full screen size or when the bottom of the image and the bottom of the display are coincident (in which case, the loss of decoding time is avoided by the spill buffer to the extent possible within the memory capacity provided. However, to avoid loss of decoding time when the bottom of the image is raised above the bottom of the screen, the variable PTS synchronization and frame switch point must be enabled in accordance with the invention so that the frame switch point may follow the end of the displayed image.

The enablement of the variable PTS synchronization is preferably performed through microcode to provide a sequence layer decode 50 at the start of sequence header processing. Hardware preferably provides some assistance during the transition by delaying the actual change over by the display by at least one and one-half frames to accommodate the previous decode to display latency for decoded frames not yet displayed.

In FIG. 3, the intervals between vertical synchronization signals are numbered 51-56 and full size image fields are displayed in each of periods 51-53 with the frame switch points coincident with vertical synchronization points in the normal and conventional manner as is described in more detail in the above-incorporated U.S. Pat. No. 5,576,765. At the start of sequence header processing, the first image is guaranteed to be a reference or I picture which is required to be decoded and stored into one of two frame buffers 70, 72 shown in FIG. 4. At the end of the previous sequence, the image being displayed at point A, upon completion of decoding of the I0 image of the new sequence, is also most likely to be a reference image. Because the variable PTS synchronization has been enabled at sequence switch 50, the frame switch point follows the bottom of the displayed image which remains coincident with the vertical synchronization signal V and is generally the same as or approximates the fixed PTS synchronization point between time intervals 52 and 53 and therefore there can be no buffer conflict at point A. The display of full screen size pictures is completed in the normal course even though the variable PTS synchronization has been enabled. The decoding of the first B picture B1 of the sequence of scaled pictures begins during display of the bottom field of the last full screen image in the previous sequence and is performed by reference to the I0 image data and data of another future image that has been stored in the other of buffers 70, 72. It should be recalled, in this regard, that the I image must be decoded in order for reference thereto during decoding of B images. Thus a series of images received and/or decoded in IBB order will be displayed in BBI order.

The decoding the B1 image is assumed to be completed by the time of completion of display of the top field of the B1 image in time interval 54. If this is not the case, image lines will be corrupted only for a single field. In this regard, the hardware must guarantee that a frame switch signal is generated under all conditions including those where a side of the image is off the display screen. Thus it is preferred that the frame switch signal be generated on the occurrence of either the last pixel of the last active display line, the start of the bottom border or the vertical synchronization signal, V, whichever comes first.

The decoding of the B2 image can be started as soon as the frame switch FS signal occurs and will usually be advanced significantly relative to the vertical synchronization signal, V, in interval 54 and providing a sufficiently greater decoding time to assure completion of decoding. (If the B1 decoding is not completed on time, the display of the B1 image is generally repeated and the synchronization error corrected later, if necessary. Alternatively, decoding of the B1 image could be terminated and the B2 image decoding started at point B when the frame switch signal is advanced.) The bottom frame of the B1 picture will be stored and displayed normally while the decoding of the B2 picture is being performed and completed. All the rest of the scaled image will be displayed normally after being decoded in accordance with the variable PTS synchronization point until a change in scaling or positioning parameters is encountered or the picture returns to a full screen display.

It should be understood that it is a principal meritorious effect of the invention to provide continuous scaling and arbitrary positioning with minimal loss of resolution and without requiring economically prohibitive increase of memory requirements. It should also be understood that it is known to provide continuous enlargement or reduction of image size by generating a greater or lesser number of display line data by interpolation from other display line data as well as performing fractional scaling during the decoding process as discussed above.

However, image resolution will be lost in continuous scaling using interpolation during enlargement. Resolution will also be lost if the desired image size requires fractional reduction during decoding to be followed by enlargement by interpolation. Interpolation processes are also more complex and bandwidth-consuming that fractional reduction during decoding. Either or both of these types of operations must be pipelined with the decoding process as shown, for example, at 82 of FIG. 4 and, in effect, require a significant portion of the decoding time within the frame display interval, particularly for interpolation. The invention, by recovering decoding time that would otherwise be lost, allows continuous scaling to be done using only size reduction by interpolation between the image sizes directly available from fractional scaling during decoding while maintaining memory requirements at economically acceptable levels or, with even smaller memory requirements to limit the amount of enlargement by interpolation required to cover all desired sizes in a continuous fashion.

Because it is desirable to minimize the capacity of the memory used for the spill buffer the placement of very small pictures at the top of the screen will require a change of latency at some point. In other words, the invention requires the spill buffer to cover the bottom border as well as the top border, as shown at 38' of FIG. 1 and the capacity of the spill buffer will be fixed in any given implementation. To avoid a requirement for increase of frame buffer capacity if latency is increased, an increase of latency is performed only when fractional image size reduction is performed during decoding so that the amount of image data is also reduced. Advantageously, however, this reduction in data also has the effect of preserving image resolution at least to the resolution of the display device itself and, in effect, multiplies the number of taps for subsampling data in memory without the increase in complexity of display hardware or memory control alluded to above.

During operation in such a mode which is, itself, known to those skilled in the art the state machine 90 controls reconfiguration of the frame buffer 74 and spill buffer 76 into three buffer registers as depicted by dashed lines 78. A spill buffer is, of course, not necessary for an increased latency of 2.0 for reference frames and 1.0 for B images. Thus, the total memory capacity of the frame buffer and the spill buffer is a variable in determination of the need for a latency change.

To test if the spill buffers are large enough to accommodate the desired scaling and positioning, an inequality is computed to determine if the number of spill buffer lines multiplied by the display rate per decode line is greater than the number of border lines in a field plus the number of vertical blanking interval lines (usually twenty-two lines) and the number of interlocked lines in the frame buffer memory as illustrated at 38' of FIG. 3. The number of interlocked lines is any number that represents the distance in scan lines of the separation maintained between read and write operations and is usually half the number of lines in a macroblock slice, generally eight lines for a sixteen line macroblock, half of which can be displayed in one field. The display rate per decode line is a conservative number describing the relative decode performance of the STB when processing a heavy memory load and can be obtained through direct measurement and is literally the number of display line times needed to decode one line and must be less than one for any real time displayable video decoder system.

This test is preferably performed at the beginning of every video decode sequence and the number of border lines is known from either the sequence header or the user controls of the STB. If the inequality is true, the invention operates with the variable PTS synchronization as described above using a low latency decode. If false, the frame and spill buffers are reconfigured and a fixed amount of fractional scaling is performed in the decode path. Additional continuous scaling such as by interpolation is performed in either case. This test ensures that only relatively small scaled images will be performed using the high latency decode method and results in an increase in image quality because the fixed scaling in the decode path followed by a scaler using a minimal number of subsampling taps for interpolation produces the effect of a scaler with a greater number of taps. Therefore, it will seldom be desirable or justified to provide a spill buffer with a capacity of greater than one-half of a display field and which could be substantially less if slight image quality loss is tolerable in view of memory cost.

In view of the foregoing, it can be seen that the invention provides a technique for recovering decoding time which would otherwise be lost prior to the vertical synchronization signal and that this decoding time becomes very significant when the bottom border of the scaled image differs in position from the bottom of the display area. The invention is completely compatible with other known techniques since it provides operation similar to full screen image display when the bottom of the scaled image coincides with the bottom of the display area and provides switching to a high latency mode only when the amount of spill buffer capacity is insufficient to recover the decoding time that would be lost in the low latency mode; a condition which is encountered only when the down-scaling is relatively severe and the image positioning is relatively high on the display screen.

By operating in the high latency mode in combination with fractional scaling in the decode path, image quality and resolution is maintained to the resolution of the display device by limiting the need to expand a fractionally reduced decoded image in view of the economic constraints on frame and spill buffer capacity while frame and spill buffer memory capacity requirements are limited the operational mode of the invention sufficient to cover continuous scaling between full screen display and half screen (one-quarter area) fractional scaling. The invention thus provides arbitrary continuous scaling of an image without loss of image quality and arbitrary screen positioning without loss of decoding time and field data corruption.

Figure 4:
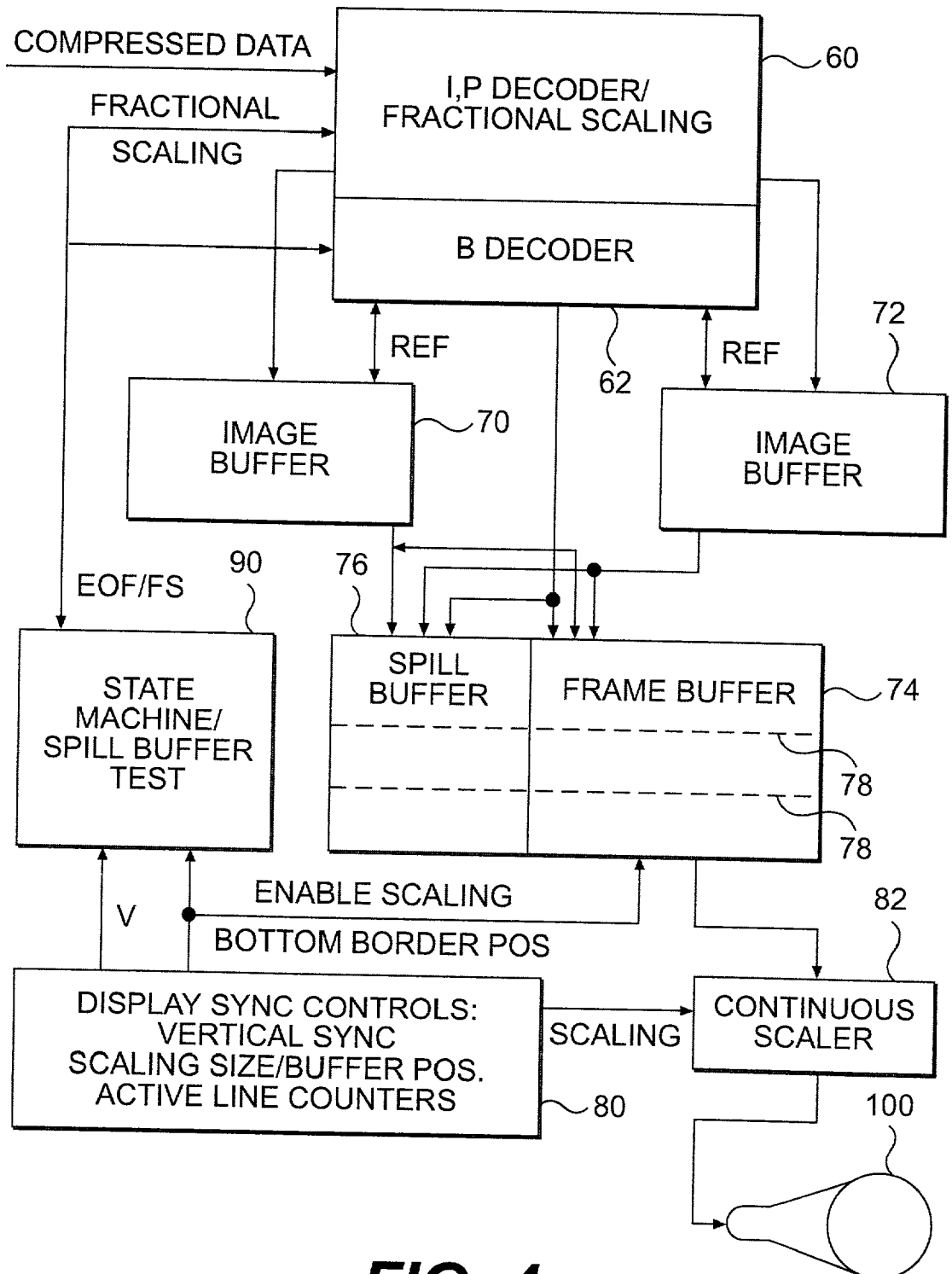
FIG. 4 is a high level block diagram illustrating operation of the invention as preferably implemented using a state machine.

In order to convey a more complete appreciation for the manner in which the invention provides this combination of meritorious effects, reference is now made to FIG. 4 which depicts a high level block diagram of the architecture of the invention as implemented using a state machine 90. It should be understood that different signals can be produced in sequence to which the state machine could respond without departing from the basic principles of the invention. It should also be understood that FIG. 4 is arranged to convey an understanding of the operation of image data decoders in general as well as the operation of the invention and may or may not reflect any particular suitable hardware architecture.

Compressed data using any desired compression standard is input to decoder 60 which is preferably capable of fractional scaling. The type of image (e.g. reference (I), predicted (P) or bidirectionally interpolated (B) will be specified in the input signal (generally in the header) along with any particular format information (e.g. aspect ratio). I and P images (one of which may be a future image) are decoded and stored in image buffers 70, 72. B images are decoded at decoder 62 under control of decoder 60 by interpolation from references to the image data stored in buffers 70, 72. The data from buffers 70, 72 and decoder 62 are stored in frame buffer 74, augmented by spill buffer 76 and then to the display in a scan format compatible therewith.

The depiction of FIG. 4 assumes that the STB includes scaling and image location controls 80 which can be enabled and disabled at the will of the operator. If enabled, a signal reflecting the same is provided to continuous scaler 82 and to state machine 90. Continuous scaler 82 interpolates the scaled display lines from the unscaled image data in the frame buffer. If the state machine 90 is provided with a signal indicating that scaling/positioning is enabled, it will respond to the next end-of-frame (EOF) or frame switch (FS) signal by performing the spill buffer size test described above. If the spill buffer is not of adequate capacity to cover the necessary top and bottom borders and vbi, the frame and spill buffer memory is reconfigured and read/write control of memory 74/76/78 is altered for high latency operation and fractional scaling is commanded at decoders 60, 62. Scaling/position control 80 controls read out accessing of memory 74/76/78 in accordance with either memory configuration.

Also responsive to the EOF/FS signal, the state machine 90 will perform a PTS synchronization test to determine if a subsequent frame should be repeated or decoding omitted to correct an excessive synchronization error. Thus the decision to perform decoding of the next frame of compressed image data is made at a time advanced from the vertical synchronization point, V, to avoid loss of decoding time while maintaining synchronization in a simple manner.

Accordingly, it is seen that the implementation using a relatively simple state machine can provide a mode of operation providing continuous scaling and arbitrary positioning that interfaces between full screen presentation and fractional reduction scaling in a substantially seamless manner and without significant, if any, loss of image quality. Low decode latency is preserved when possible and high decode latency is limited to conditions where display quality may be maintained without increase of memory capacity of complexity for sub-sampling.

While the invention has been described in terms of a single preferred embodiment, those skilled in the art will recognize that the invention can be practiced with modification within the spirit and scope of the appended claims.

The invention claimed is:

1. A method of operating a motion video decoder for decoding compressed image data, said method including steps of determining a variable frame switch point in accordance with a signal corresponding to completion of decoding of a previous frame, and synchronizing said motion video decoder for decoding compressed image data in accordance with the later occurring of beginning display of a bottom border of a scaled image and said variable frame switch point.

2. A method as recited in claim 1, comprising further steps of testing spill buffer capacity responsive to said signal to produce a test result, and controlling scaling in a decoding path of said decoder and altering decoder latency in response to said test result.

3. A method as recited in claim 2, including the further step of reconfiguring a frame buffer to accommodate a increased latency of motion video data scaled in said decoding path.

4. A method as recited in claim 3, including the further step of
continuously scaling a motion video image from said motion video data scaled in said decoding path.

5. A method as recited in claim 4, wherein said continuously scaling step is performed by interpolation.

6. A method as recited in claim 2, wherein said spill buffer has a capacity equal to or less than 0.5 fields.

7. A method as recited in claim 2, wherein said spill buffer has a capacity equal to or less than one field.

8. A method as recited in claim 1, wherein decoder to display latency of reference motion video images is 1.5 frames and latency of interpolated motion video images is 0.5 frames.

9. A method of operating a motion video decoder comprising steps of
testing spill buffer capacity responsive to a signal to produce a test result, and
controlling scaling in a decoding path of a decoder and altering decoder latency in response to said test result,
wherein decoder to display latency of reference motion video images is 1.5 frames and latency of interpolated motion video images is 0.5 frames when said testing step indicates spill buffer capacity is sufficient for selected scaling of said motion video.

* * * * *